(12) United States Patent
Blackmon et al.

(10) Patent No.: US 9,683,188 B2
(45) Date of Patent: *Jun. 20, 2017

(54) HIGH SULFUR FUEL PELLET WITH REDUCED SO2 EMISSION

(71) Applicant: ELITE FUELS LLC, Portland, OR (US)

(72) Inventors: Donald Ray Blackmon, Milwaukie, OR (US); Gerald Joseph Byrd, Sr., Kirkland, WA (US)

(73) Assignee: ELITE FUELS LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,266

(22) Filed: Sep. 15, 2015

(65) Prior Publication Data

US 2016/0002556 A1    Jan. 7, 2016

Related U.S. Application Data

(63) Continuation of application No. 14/216,772, filed on Mar. 17, 2014, now Pat. No. 9,163,193, which is a (Continued)

(51) Int. Cl.
*C10L 5/00* (2006.01)
*C10L 10/02* (2006.01)
*C10L 5/02* (2006.01)
*C10L 5/04* (2006.01)
*C10L 5/36* (2006.01)
*C10L 5/44* (2006.01)
*C10L 9/10* (2006.01)
*C10L 10/04* (2006.01)
*C10L 5/48* (2006.01)

(52) U.S. Cl.
CPC ............ *C10L 10/02* (2013.01); *C10L 5/02* (2013.01); *C10L 5/04* (2013.01); *C10L 5/361* (2013.01); *C10L 5/363* (2013.01); *C10L 5/366* (2013.01); *C10L 5/442* (2013.01); *C10L 5/48* (2013.01); *C10L 9/10* (2013.01); *C10L 10/04* (2013.01); *C10L 2200/024* (2013.01); *C10L 2200/0209* (2013.01); *C10L 2200/0469* (2013.01); *C10L 2230/02* (2013.01); *C10L 2230/04* (2013.01); *Y02E 50/10* (2013.01); *Y02E 50/30* (2013.01)

(58) Field of Classification Search
CPC .... C10L 10/02; C10L 5/02; C10L 5/04; C10L 5/361; C10L 5/363; C10L 5/366; C10L 4/442; C10L 9/10; C10L 10/04; C10L 5/48; C10L 2200/0209; C10L 2200/024; C10L 2230/04; C10L 2230/02; C10L 2200/0469
See application file for complete search history.

(56) References Cited

U.S. PATENT DOCUMENTS 2,901,429 A    8/1959    Russell et al.
2,933,452 A    4/1960    Byrd
(Continued)

*Primary Examiner* — Cephia D Toomer
(74) *Attorney, Agent, or Firm* — McCoy Russell LLP

(57) ABSTRACT

The present description relates to a method and system for generating a fuel from high sulfur fuel waste materials having a reduced SO2 emission. In one example, the fuel may include petroleum coke, a biomass constituent, and an alkali substituent. Further in another example, the fuel may include iron oxide catalyst increasing the capture of SO2.

20 Claims, 2 Drawing Sheets

Related U.S. Application Data continuation of application No. 13/526,301, filed on Jun. 18, 2012, now Pat. No. 8,702,821, which is a continuation-in-part of application No. 13/415,631, filed on Mar. 8, 2012, now Pat. No. 8,702,820.

(56) References Cited

U.S. PATENT DOCUMENTS

| | | | |
|---|---|---|---|
| 3,332,755 A | | 7/1967 | Kukin |
| 4,210,423 A | | 7/1980 | Yan |
| 4,515,601 A | | 5/1985 | Charters |
| 4,786,485 A | | 11/1988 | Kirchgessner et al. |
| 5,169,931 A | | 12/1992 | Sears et al. |
| 5,250,080 A | | 10/1993 | Michelena et al. |
| 8,702,820 B2 * | 4/2014 | Blackmon | C10L 10/00 44/589 |
| 8,702,821 B2 * | 4/2014 | Blackmon | C10L 5/02 44/589 |
| 9,163,193 B2 * | 10/2015 | Blackmon | C10L 5/02 |

* cited by examiner

HIGH SULFUR FUEL PELLET WITH REDUCED SO2 EMISSION

CROSS-REFERENCE TO RELATED APPLICATIONS

The present application is a continuation of U.S. patent application Ser. No. 14/216,772, entitled "HIGH SULFUR FUEL PELLET WITH REDUCED SO2 EMISSION," filed Mar. 17, 2014, which is a continuation of U.S. patent application Ser. No. 13/526,301, entitled "HIGH SULFUR FUEL PELLET WITH REDUCED SO2 EMISSION," filed on Jun. 18, 2012, which is a continuation-in-part of U.S. application Ser. No. 13/415,631, "HIGH SULFUR FUEL PELLET WITH REDUCED SO2 EMISSION," filed on Mar. 8, 2012, the entire contents of each are incorporated herein by reference for all purposes.

FIELD

The present description relates to a method and system for a fuel pellet from high sulfur fuel waste materials having a reduced SO2 emission.

BACKGROUND AND SUMMARY

The emission of sulfur dioxide (SO2) from sulfur bearing fuels has been recognized as an environmental problem for many decades. Regulations have been implemented to attempt to reduce the emission of SO2. It is known that SO2 is a major air pollutant and has significant impacts upon human and animal health. In addition high concentrations of SO2 in the atmosphere can influence the habitat suitability for plant communities. Further, SO2 emissions are a precursor to acid rain and atmospheric particulates.

Historically, burning coal and fuel oil used in power boilers resulted in a high level release of SO2. In recent years, petroleum coke has become an alternative fuel. Petroleum coke (a waste product from crude oil) is typically derived from coking heavy oil at many oil refineries. Petroleum coke has high sulfur content which when burned has high SO2 emissions. If the crude oil is sour, the resulting coke will have high sulfur content.

Approximately over 50% of the current U.S. power supply comes from coal fired power plants. The fuel is selected on a balance of BTU value and sulfur content. All new plants built since 2005 must conform to stringent SO2 emission controls. The consequence is the necessity to install fuel gas desulfurization (FGD) systems. These desulfurization systems are methods of contacting the flue gas laden SO2 with alkali sorbents. The alkali sorbents may be limestone, lime and sodium base alkali. The sorbents can be applied as slurries or dry powders. In some uses, the flue gas is placed in contact with the sorbents to achieve the longest contact and at the temperature most favorable to the alkali to acid reaction. The most favorable temperature range is frequently estimated as 750 C to 1100 C. The most efficient capture of SO2 is stated to be in a range of 900 C to 1100 C. There has been much experimentation in determining the effect of the surface area of the alkalis with efficiency of SO2 capture. The high temperatures needed to ensure capture result in loss of generation capacity and/or increased energy consumption.

The costs of attempting to capture the SO2 with current systems are high. For example, the capital, operating and maintenance cost per short ton of SO2 removed (in 2001 US dollars) are highest for wet scrubbers (largest percentage of FGD scrubbers). For wet scrubbers larger than 400 MW, the cost is $200 to $500 per ton. For wet scrubbers smaller than 400 MW, the cost is $500 to $5,000 per ton. Similarly with spray dry scrubbers larger than 200 MW, the cost is $150 to $300 per ton and for spray dry scrubbers smaller than 200 MW, the cost is $500 to $4000 per ton.

For small boilers, such as hog fuel boilers, the capital cost and maintenance of these wet scrubber systems are prohibitive. Injecting sorbent into flue gas passing through spray towers or contact beds have plugging problems that are inherent to the system.

Due to the high costs of remediation, another option that is currently used is to transport the high-sulfur fuel to a waste destination where regulations may be less stringent. However, although it may be possible to ship the high sulfur fuel (waste product) to a waste destination, the burning at the waste destination results in a release of SO2 (although in a different location). Moreover, waste product which is simply stored has further negative environmental effects. Likewise, transport impacts in moving the waste fuel, including rail and shipping impacts, have negative environmental effects.

The inventors herein have recognized the above-mentioned disadvantages and have developed apparatus and methods for producing a manufactured fuel pellet made from high sulfur carbonaceous compounds which emits a reduced level of SO2 upon burning. In some example embodiments, petroleum coke is included in a fuel composition that utilizes the high carbon content of the coke, a biomass constituent that provides the volatiles to make the volatile deficient coke more ignitable and an alkali constituent to capture the SO2 produced by burning high sulfur coke. In other examples, a catalyst, such as an iron oxide catalyst may further be added to increase the capture of SO2. The fuel composition may be formed as pellets, powders, briquettes, beads or any other agglomerates.

The present embodiments disclosed herein may provide several advantages. Specifically, the approach may reduce the level of released SO2. In addition, the approach utilizes waste materials which previously required storage, transportation or alternative processing. By providing the herein disclosed high sulfur fuel pellet with reduced SO2 emissions, environmental impact of the waste product can be reduced while still utilizing the fuel properties of the product.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
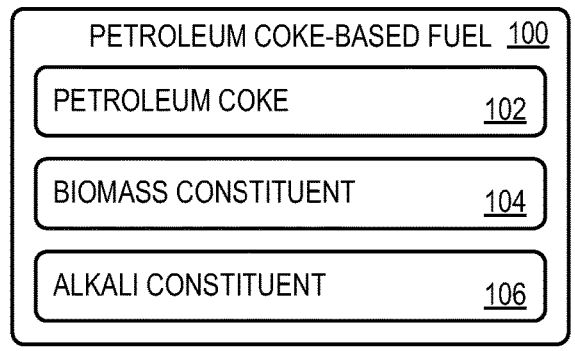
FIG. 1 shows a schematic drawing depicting components for an example petroleum coke-based fuel.

The present description is related to systems and methods for generating fuel pellets from a high sulfur waste product where the fuel pellets have a reduced level of SO2 emission. In one non-limiting example, the fuel pellets may be configured as illustrated in FIG. 1. The method of FIG. 2 may be executed to generate the petroleum coke based fuel shown in FIG. 1.

Fuels, such as coal and fuel oil, may be utilized for electricity and/or heat generation due to high energy density. Increasingly, petroleum coke, which results from coking heavy oil at oil refineries, has been identified as an alternative fuel source due to its high carbon content and nature as an industrial byproduct/waste product. However, the combustion of petroleum coke may result in an unsafe level of SO2 emissions. Once released into the atmosphere, SO2 can further oxidize to for H2S04, thus forming acid rain. SO2 may further act as a precursor to increased atmospheric particulate concentration. In response, regulations limiting SO2 emissions exist throughout the world.

Typically, flue gas resulting from the combustion of high-sulfur materials may be treated using one or more remediation mechanisms. Such mechanisms may include, for example, Fuel Gas Desulfurization "FGD" systems configured to bring the flue gas in contact with wet (e.g., slurry) or dry (e.g., powdered) alkali sorbents (e.g., limestone, lime, sodium-based alkali). Dry systems may require high temperatures. Other systems may require long exposure times to ensure enough SO2 has been captured. The high temperature requirements result in decreasing generation capacity and/or increasing energy consumption. It is noted that wet scrubbers may be near 100 C. Furthermore, such systems may require additional maintenance to maintain efficiency. For example, systems configured to spray a sorbent slurry may require frequent nozzle clean-outs, thus increasing cost and downtime.

Furthermore, remediation mechanisms may have a greater impact on smaller generation plants (e.g., smaller than 400 MW) such that remediation may cost an order of magnitude greater versus a larger generation plant. As noted above and as an example, remediation at a plant smaller than 400 MW may cost $500 to $5000 per ton of SO2 removed, while remediation at a plant larger than 400 MW may cost $200 to $500 per ton of SO2 removed.

Regardless of generation capacity, as mentioned above, it may be more economically feasible to transport high-sulfur fuel from areas with more stringent regulations to areas with looser regulations rather than or in combination with installing one or more remediation mechanisms. Such transport activities may result in a greater environmental impact due to both the burning of high-sulfur fuels and the transport of such fuels to the waste destination.

Accordingly, as described in more detail herein, a fuel pellet comprising a high-sulfur carbonaceous compound is disclosed such that the burning of said fuel pellet may result in acceptable (e.g., below regulated limit) SO2 emissions without utilizing independent SO2 remediation systems, such as FGD. The disclosed systems and methods thus enable use of a waste product, high sulfur fuel, into a usable product substantially reducing the SO2 emissions of the waste product.

While the present disclosure is directed towards fuel pellets, it will be understood that the fuel discussed herein may comprise any suitable form. Other example forms include, but are not limited to, powder, briquettes, beads and/or various agglomerates. In some examples, non-powdered forms may be utilized to avoid product loss, potential health impact, and/or environmental impact due to increased dust concentration in a powdered form. Powdered forms may further require additional consideration during transport and/or storage.

FIG. 1 shows a schematic drawing depicting components for a petroleum coke-based fuel 100. Fuel 100 comprises petroleum coke 102, a biomass constituent 104, and an alkali constituent 106. Additional additives may be included in fuel 100 without departing from the scope of the disclosure.

As previously mentioned, petroleum coke 102 is a byproduct/waste product of crude oil refining comprising a high carbon and sulfur content. Petroleum coke may be attractive as an energy source since typical energy density may be approximately 15,000-16,000 BTU per pound.

While the high carbon content of petroleum coke 102 may be desirable for its energy content, the sulfur content may lead to excessive SO2 emissions. For example, petroleum coke may comprise approximately 3.2% sulfur. However, emissions regulations in the United States may limit sulfur emission to less than 2%. Thus, the petroleum coke, although having a substantial energy density in regards to use as a fuel, is considered a waste product due to the level of sulfur and the resulting SO2 emissions when burned.

In the present disclosure, petroleum coke may be combined with a biomass constituent and an alkali constituent. In one example, alkali constituent 106 may comprise one or more compounds selected to capture the SO2 produced during combustion of fuel 100. For example, Alkali constituent 106 may be selected at least in part based on its surface area, as increased surface area may increase the amount of SO2 captured by alkali constituent 106. In some embodiments, alkali constituent 106 may be further processed (e.g., by grinding) to increase surface area.

Alkali constituents 106 may comprise, for example, lime and calcium acetates. In some embodiments, alkali constituents 106 may be further processed to augment performance.

The alkali constituent may also be referred to herein as an SO2 sorbent. These SO2 sorbents may have enhanced reactivity compared to commercially available alkalis. As a non-limiting example, the SO2 sorbents may be enhanced by selecting the most reactive CaO and slaking it in reactions that provide Ca(OH)2 with the most surface area. Further, as another example, one or more surfactants may be incorporated into the lime preparation process in order to increase SO2 capture efficiency of alkali constituents 106.

It should be noted that the selection of the particle size of the petroleum coke may affect the efficiency of the SO2 capture. It is noted that in some examples (not as a limitation) capture of sulfur may be in the range of 64% to 75%.

Further combined, in some examples, with the coke and the alkali constituent, is biomass constituent 104. Biomass constituent 104 may provide volatiles not present or are deficient in petroleum coke 102. Such volatiles may be selected as to increase the combustibility of the petroleum coke 102. Biomass constituent 104 may comprise, for example, wood waste which, like petroleum coke 102, may be a byproduct/waste product of one or more industrial processes.

It should be appreciated that the biomass constituent may be the wood waste (1500 Kcal/Kg natural state; 3500 Kcal/Kg dry state approx. heating value) described above or may be other biomass products, waste products or other combinations of such products. For example, the biomass constituents may be, or may be combinations, of other animal and plant biproducts, including, but not limited to animal dung, such as cattle dung (1000 Kcal/Kg natural state; 3700 Kcal/Kg dry state approx. heating value), bagasse (2200 Kcal/Kg natural state; 4400 Kcal/Kg dry state approx. heating value), wheat and rice straw (2400 Kcal/Kg natural state; 2500 Kcal/Kg dry state approx. heating value), cane trash, rice husk, leaves and vegetable wastes (3000 Kcal/Kg natural state; 3000 Kcal/Kg dry state approx. heating value), coconut husks, dry grass and crop residues (3500 Kcal/Kg natural state; 3500 Kcal/Kg dry state approx. heating value), groundnut shells (4000 Kcal/Kg natural state; 4000 Kcal/Kg dry state approx. heating value), coffee and oil palm husks (4200 Kcal/Kg natural state; 4200 Kcal/Kg dry state approx. heating value), cotton husks (4400 Kcal/Kg natural state; 4400 Kcal/Kg dry state approx. heating value), peat (6500 Kcal/Kg natural state; 6500 Kcal/Kg dry state approx. heating value), etc.

As a non-limiting example, a high sulfur fuel pellet with reduced SO2 emissions may include a combination of high sulfur petroleum coke, a biomass constituent and an alkali constituent. A bituminous emulsion may further make the pellets waterproof. As one example, the biomass constituent may have enhanced reactivity by using the reactive CaO and slaking it in reactions that provide Ca(OH)2 with the most surface area. Selected particle sizes for the pet coke may increase the efficiency of SO2 capture. Further, the lime SO2 capture efficiency may be increased by incorporating surfactants in the lime preparation process. Such a fuel pellet may capture SO2 at temperatures as low as 750 C and avoid the necessity of FGD systems to handle high sulfur petroleum coke fuel.

As an example, a fuel pellet may include a biomass constituent in the range of approximately 10 to 50 percent by weight of the total mixture of the fuel pellet. The alkali constituent may be in the range of approximately 1 to 30 percent by weight of the total mixture of the fuel pellet. The petroleum coke may fall in the range of 5 to 95 percent by weight but should be balanced with other constituents to provide a fuel pellet with acceptable volatile, BTU and SO2 levels in any particular use as a fuel. As one example, and not as a limitation, the petroleum coke may be approximately 65% by weight of the fuel pellet, the biomass constituent may be approximately 30% by weight of the fuel pellet and the alkali constituent may be approximately 5% by weight of the fuel pellet.

Figure 2:
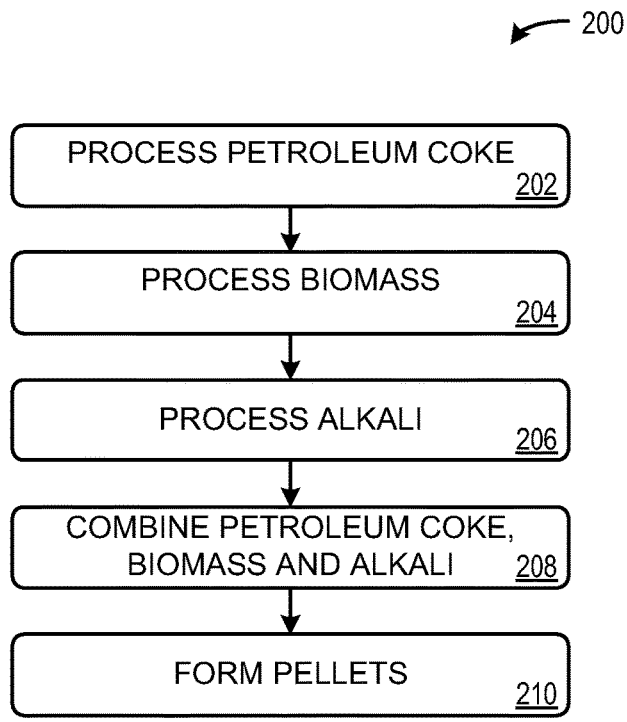
FIG. 2 shows a process flow depicting an embodiment of a method for producing a petroleum coke-based fuel.

FIG. 2 shows a process flow depicting an embodiment of a method 200 for producing a petroleum coke-based fuel. Method 200 comprises, at 202, processing petroleum coke. Typically, petroleum coke is supplied from refineries in granule form. Accordingly, processing the petroleum coke may comprise one or more processes (e.g., grinding) configured to produce a substantially powdered form of petroleum coke. A finely powdered petroleum may be used in some examples as an increased surface area may result in increased combustibility. In other embodiments, the petroleum coke may be supplied in a suitably powdered form.

It should be appreciated that in some embodiments, the pellets may be of a select hardness to maintain form regardless of environmental conditions, storage conditions, etc.

At 204, method 200 comprises processing a biomass constituent (e.g., biomass constituent 104 of FIG. 1). For example, the biomass constituent may comprise byproducts/waste products from a sawmill or other wood processor. Accordingly, similar to the processing of the petroleum coke, processing the biomass constituent may comprise one or more processes (e.g., grinding) configured to produce a substantially powdered form of the biomass constituent. A fine powder may be used in some examples, as the increased surface area may increase the combustibility of the overall fuel mixture. The biomass should not be construed as limited to wood waste. It can also include paper of any type as well as cardboard, etc. The biomass can also include agricultural waste such as straw from crops, corn stalks or other plant stems. Even corn could be considered as it is for fuel in stoves. In selecting any biomass, for inclusion in the pellet mix, the volatiles content and BTU values must be considered in making a balanced fuel pellet. Further, waste materials may be utilized. Moreover cost efficiency may also be a consideration in selecting a biomass.

At 206, method 200 comprises processing the alkali. As described above in reference to FIG. 1, alkali (e.g., alkali constituent 106) may comprise one or more compounds selected to capture the SO2 produced during combustion of the fuel mixture. Since increasing surface area of the alkali constituent may increase the efficiency of SO2 capture, processing may comprise one or more processes (e.g., grinding) configured to produce an alkali with increased surface area. Furthermore, processing may involve incorporating surfactants into the lime preparation process in order to increase SO2 capture rate. It will be understood that in some embodiments, alkali may be supplied in a suitable form such that no further processing occurs.

At 208, method 200 comprises combining the petroleum coke (e.g., petroleum coke 102 of FIG. 1), biomass constituent (e.g., biomass constituent 104 of FIG. 1), and additives (e.g., alkali sorbent 106 of FIG. 1, and/or other additives) to produce a fuel mixture. Combining may comprise one or more processes (e.g., mixing, heating, stirring, etc.) configured to produce a fuel mixture of the present disclosure (e.g., fuel mixture 100 of FIG. 1).

At 210, method 200 comprises forming the fuel mixture into pellets. As mentioned above, it will be understood that the fuel mixture may be processed into any number of suitable forms including, but not limited to, briquettes, powders, beads and/or various agglomerates. Pellets as used herein include, but are not limited to, briquettes, powders, beads and/or various agglomerates. Accordingly, forming the fuel mixture may include one or more processes (e.g., molding, drying).

As will be appreciated by one of ordinary skill in the art, the method described in FIG. 2 may represent one or more of any number of processing and manufacturing strategies. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

Powder River Basin sub bituminous "PRB" coal, including a similar energy density is currently used by approximately 20% of coal-fired plants in the United States. Accordingly, the disclosed fuel pellets may be easily consumed in these plants without significant adjustment to operating parameters.

TABLE 1

Comparison between fuel pellets of
the present disclosure and PRB coal.

|  | PRB Coal | Fuel Pellets |
|---|---|---|
| Carbon | 70% | 74% |
| Hydrogen | 4.6% | 5.5% |
| Sulfur | 0.5% | Up to 5.5% |
| Nitrogen | 0.93% | 0.83% |
| Oxygen | 16.8% | 0.94% |
| Ash | 7.4% | 16.8% |
| BTU/lb | 12,000 | 13,000 |
| Volatiles | 43% | 42% |

As illustrated in Table 1, the sulfur content of the resulting fuel pellet may be as high as 5.5%. However, due to the additional elements of the fuel pellets (e.g., alkali sorbents), the resulting flue gas may comprise a sulfur concentration comparable to the PRB Coal, which may have a sulfur content of 0.5%.

While the ash content of the fuel pellets is illustrated as being twice that of PRB coal, it will be understood that the ash content is dependent upon the sulfur content of the petroleum coke. The remaining elements of the fuel pellets (i.e., alkali constituents and biomass constituents) may be adjusted according to the petroleum coke composition. Accordingly, the ash content will be lower, and the BTU content will be higher, when a lower sulfur petroleum coke is used.

As examples to further illustrate the invention, pellet mixes are described below. It should be appreciated that these examples are provided for illustrative purposes only and not as a limitation.

In example one, the pellet mix dry basis was provided as follows:

| Component | Dry basis (pellet) | Ash content |
|---|---|---|
| Petroleum Coke | 1249 g | 2.50 |
| Wood Fiber | 380 | .76 |
| Lime (Ca(OH)) | 264 (200g CaO) | 200 |
| Asphalt | 69 | |
| | Total 1962 g solids | 203 g ash |

The estimated percent ash in the formed pellets was 203/1962×100=10.4% ash It is noted that the lime Ca(OH)2 starts to convert to CaO at 450 C. Each of the below samples had different levels of slaking and grind. As noted from the chart below, grind 2 was not as fine as grind 1. The reaction of CaO with SO2 may be dependent on the fineness of the coke. Further, in some examples, the combination with high surface area lime (slake 3) provides a high degree of SO2 capture.

| Sample | Slake | Grind | Ash | + in ash* | Est. SO2 Capture | % of Orig.** |
|---|---|---|---|---|---|---|
| 1 | 2 | 1 | 15.9 | 5.6 | 5.6 | 80 |
| 2 | 2 | Not ground | 13.7 | 3.7 | 3.7 | 53 |
| 3 | 3 | 1 | 16.8 | 6.4 | 6.4 | 91 |
| 4 | 4 | 2 | 15.4 | 5.4 | 5.4 | 77 |
| 5 | 3 | 2 | 14.75 | 4.6 | 4.6 | 66 |

*Ash in pellet mix 10.4%
**Sulfur calculation - 1249 g coke × 5.5% = 69 g/1962 × 100 = 3.5% S = 7.0% SO2 in pellet mix (dry basis)

Determination of the percent CAO added to the composition may be varied depending on use. In one non-limiting example, 1300 g of pet coke was contained in the pellet batch of 2000 g. The quantity of sulfur was 1300 g×5.5% S=71.5 g of sulfur. One gram of sulfur=2 g SO2 where the reaction of SO2+CAO is equal to CASO3 such that 1.32 g SO2 is neutralized by 12 g CAO. With the 143 g sulfur in the pellet mix, 264 g CA(OH)2 (lime)-74 MW-1.32 g lime yields 1 g CAO. The 264 g lime added yields 200 gCAO.

Of the 143 g SO2 in the 2000 g pellet mix, at 1.14 g SO2 to 1.0 g CAO, 125 g were used to neutralize. In another example, 200 g CAO or 185% CAO used based on 100% CAO utilization of the CAO resulting in 60 to 80% efficiency. In one example, with calcium acetate and calcium magnesium acetate the % CAO was 129% and 90% of required amount to neutralize the 143 g sulfur in the pellets.

It is noted that in prior FGD methods (flue gas desulfurization), the % S capture is generally in the range of 60% to 80%. The disclosed pellet technology compares favorably with the FGD methods with the Ca/S of 2.0/1.0, however it should be appreciated that the ratio may be even more favorable with the disclosed pellets and such range is not intended as a limitation. Further, in some examples, a 70% to 80% S capture at a Ca/S of 1.7/1.0 was found. The lower Ca/S may be due to lime selection. It is noted that the stoichiometric Ca/S ration is 1.25/1.0.

As a non-limiting example of the calculated BTU/lb and lbs SO2/mm BTU in pellet formulation, total BTU per lb of pellet may be retained in the pellet formulation. For example, 1300 lb coke×15,415=20,039,500 BTU/2000=10, 019 lb. With 400 lb WF×8900=3,560,000 BTU/2000 lb=1780/lb. Total BTU per lb of pellet 11,7999. With lab analysis, an average BTU over a series of samples was 13456. The lbs SO2/mm BTU similarly calculated with 1300 lbs×5.5%=71.5 lbs sulfur equaling 143 lbs SO2. 143/2000=0.0715 SO2 lb pellet×1000000/13456=5.3 lbs SO2/mm BTU. With the formulation of 0.0715×1000000/11799=6.1 lbs SO2/mm BTU. As a further example, some samples yield less lbs SO2/MM BTU. The average ratio of % S/lbs SO2 per pellet formation was 1.48. An example, non-limiting ratio range may extend from 1.37-1.50.

As further non-limiting examples to illustrate aspects of the invention, we note that in one example, a 2000 g batch of coke pellet mix was converted to a dry basis of 1893 g of coke pellet mix. The batch included 264 g of lime (Ca(OH)2. In this example, the batch was 76% CaO. It is noted that the lime converts to CaO at 450 C. The amount of CaO in the example, including using 76% CaO in lime would be 201 gCaO/1893 or approximately 0.106 g CaO/lb pellet mix (dry basis). As such, there would be in this non-limiting example 10.6 lbs CaO per 100 lbs pellet for approximately 10.6% ash. Another 0.2% ash from coke and wood fiber and the ash may be in the range of 10.8%.

In some examples, the ash was higher than 10.8%. The average for samples was approximately 15% ash. As another illustrative example, in 10.8 lbs ash/100 lb with analysis at 15 lb, a gain of 4.2 lb was observed. 3.44 lbs SO2 or 1.72 lbs sulfur was further observed. Starting with 3.6 lb sulfur/100 lb and removal of five pellets (48% of the sulfur) resulted in a fuel pellet with 1.88% average sulfur content.

Further, on individual pellet mixes the ash increased by 6 lb/100 lb (16.8–10.8) resulting in a pellet of 1.05% sulfur. Using the same calculation as above, of the 3.6% in the pellet mix, there was a removal of 71% of the sulfur. The increase in ash would be higher at 900 C to 1000 C.

As a further example formulation to produce a fuel briquette of less that 2% sulfur from the 5.5% sulfur coke a 100 lbs mix may include 65 lbs coke, 30 lbs wood fiber and 5 lb hydrated lime producing a briquette of 11,000 BTU/lb, 1.5 to 2.0% sulfur and 8% ash. The binder may contribute a minimal level of sulfur but not enough to exceed the 2% level.

Figure 3:
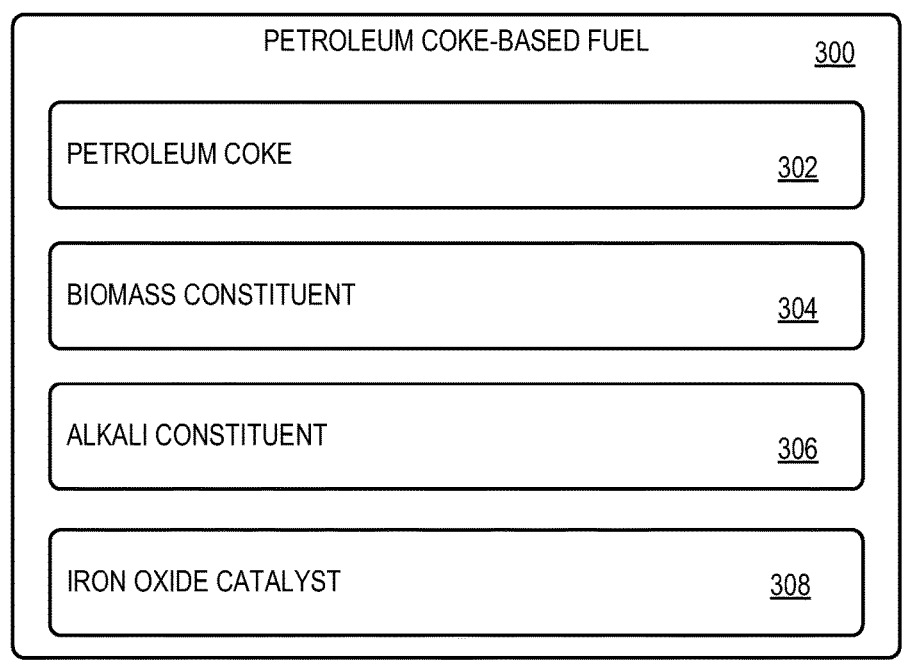
FIG. 3 shows a schematic drawing depicting components for another example petroleum coke-based fuel comprising an iron oxide catalyst.

Turning now to another example, FIG. 3 provides an illustration of components for a petroleum coke-based fuel 300. Fuel 300 comprises petroleum coke 302, a biomass constituent 304, an alkali constituent 306, and iron oxide catalyst 308. Additional additives may be included in fuel 100 without departing from the scope of the disclosure. Further, the description above in regards to petroleum coke-based fuel 100 applies to the coke-based fuel 300 described here.

As described above, petroleum coke 302 is a byproduct/waste product of crude oil refining comprising a high carbon and sulfur content. While the high carbon content of petroleum coke 102 may be desirable for its energy content, the sulfur content may lead to excessive SO2 emissions. Thus, the petroleum coke, although having a substantial energy density in regards to use as a fuel, is considered a waste product due to the level of sulfur and the resulting SO2 emissions when burned.

In the present disclosure, petroleum coke may be combined with a biomass constituent and an alkali constituent. In one example, alkali constituent 306 may comprise one or more compounds selected to capture the SO2 produced during combustion of fuel 300. For example, alkali constituent 306 may be selected at least in part based on its surface area, as increased surface area may increase the amount of SO2 captured by alkali constituent 106. In some embodiments, alkali constituent 306 may be further processed (e.g., by grinding) to increase surface area.

Alkali constituents 306, also be referred to as an SO2 sorbent, may comprise, for example, lime and calcium acetates. In some embodiments, alkali constituents 306 may be further processed to augment performance.

Further combined, in some examples, with the coke and the alkali constituent, is biomass constituent 304. Biomass constituent 304 may provide volatiles not present or are deficient in petroleum coke 302. Such volatiles may be selected as to increase the combustibility of the petroleum coke 302. Biomass constituent 304 may comprise, for example, wood waste which, like petroleum coke 302, may be a byproduct/waste product of one or more industrial processes.

In addition, the fuel pellet may include iron oxide catalyst, in the form of $Fe_2O_3$. In some examples, the iron oxide may be 2 to 4% by weight of the composition. The $Fe_2O_3$ may be added to catalyze the reaction of CaO and SO2. In some examples, the addition of $Fe_2O_3$ may increase the capture of SO2 by 25 to 35% in comparison to a fuel pellet without the addition of iron oxide.

It should be appreciated that although described in this example with an iron oxide catalyst, other suitable catalysts may be used without departing from the scope of the disclosure. Thus, a catalyst that catalyzes the reaction of CaO and SO2 may be included in the pellet, in combination with the iron oxide catalyst or as a standalone catalyst.

As a non-limiting example, a high sulfur fuel pellet with reduced SO2 emissions may include a combination of high sulfur petroleum coke, a biomass constituent, an alkali constituent and iron oxide catalyst. As an example, a pellet with high sulfur petroleum coke, a biomass constituent (such as wood chips), and an alkali constituent was shown to have a 75.4% capture of SO2. With the addition of the iron oxide catalyst, a pellet was tested to show a 95.3% and 94.4% capture. The range of capture with the iron oxide catalyst is between 75% and 95%.

Below is a chart showing a comparison between two pellets. It is noted that pellet #1, included petroleum coke 130 gm, wood fiber 40 gm and lime 22 gm and a binder. Pellet #2, illustrated in the chart below, included petroleum coke 130 gm, wood fiber 40 gm, lime 22 gm, $Fe_2O_3$ 2.6 gm and a binder.

|  | Pellet #1 | Pellet #2 (with Iron Oxide catalyst) |
| --- | --- | --- |
| Sulfur in pellet | 3.57% | 3.35% |
| Ash | 14.84% | 15.62% |
| SO3 in ash | 45.38% | 50.61% |
| S in ash | 18.15% | 20.24% |
| gm S in ash | 2.69 | 3.16 |
| Percent SO2 capture | 75.3% | 94.4% |

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A fuel comprising:
   petroleum coke, having a sulfur content up to 5.5%;
   a biomass constituent;
   an alkali constituent adapted to capture SO2 emissions by reacting with sulfur of the petroleum coke upon burn of the fuel; and
   an iron oxide catalyst reducing SO2 emissions to less than 10 percent;
      wherein the petroleum coke, the biomass constituent, the alkali constituent, and the iron oxide catalyst are combined to form a fuel with decreased SO2 emissions at temperatures at or above 750 C.

2. The fuel of claim 1, wherein the fuel is in the form of one or more of a briquette, powder, bead, and various agglomerates.

3. The fuel of claim 1, wherein the alkali constituent is one of limestone, lime or sodium base alkali.

4. The fuel of claim 3, wherein the alkali constituent comprising lime is slaked.

5. The fuel of claim 1, further comprising one or more surfactants incorporated in the alkali constituent.

6. The fuel of claim 1, wherein the biomass constituent is wood waste.

7. The fuel of claim 1, wherein the biomass constituent includes a volatile to increase combustibility of the petroleum coke.

8. The fuel of claim 1, wherein the alkali constituent is processed to increase surface area of the alkali constituent, wherein processing includes grinding the alkali constituent, and wherein the increased surface area captures an increased amount of SO2.

9. A fuel comprising:
petroleum coke, having a sulfur content up to 5.5%;
a biomass constituent to provide volatiles;
an SO2 sorbent to capture SO2 emissions upon burn of the fuel; and
$Fe_2O_3$ as a catalyst reducing SO2 emissions in comparison to the fuel without addition of $Fe_2O_3$;
wherein the petroleum coke, the biomass constituent, the SO2 sorbent, and the $Fe_2O_3$ are combined to form a fuel with maximized BTU value and reduced SO2 emissions at temperatures at or above 750 C.

10. The fuel of claim 9, wherein the SO2 sorbent is Ca(OH)2.

11. The fuel of claim 9, wherein the biomass constituent is in a range of 10 to 50 percent by weight of the fuel.

12. The fuel of claim 9, wherein the SO2 sorbent is in a range of 1 to 30 percent by weight of the fuel.

13. The fuel of claim 9, wherein the petroleum coke is in a range of 50 to 90 percent by weight of the fuel.

14. The fuel of claim 9, wherein the fuel is in the form of one or more of a briquette, powder, bead, and various agglomerates.

15. The fuel of claim 9, where the $Fe_2O_3$ is in a range of 2 to 4 percent by weight of the fuel.

16. The fuel of claim 9, wherein the $Fe_2O_3$ catalyzes a reaction between CaO and SO2.

17. A fuel comprising:
petroleum coke in a range of 50 to 90 percent by weight of the fuel;
wood waste in a range of 10 to 50 percent by weight of the fuel;
Ca(OH)2 in a range of 1 to 30 percent by weight of the fuel; and
$Fe_2O_3$ in a range of 2 to 4 percent by weight of the fuel.

18. The fuel of claim 17, wherein the petroleum coke, the wood waste, the Ca(OH)2, and the $Fe_2O_3$ are combined to form a fuel with decreased SO2 emissions at temperatures at or above 750 C.

19. The fuel of claim 17, wherein the $Fe_2O_3$ catalyzes a reaction between CaO and SO2, and Ca(OH)2 is a sorbent to capture SO2 emissions.

20. The fuel of claim 17, wherein the fuel is in the form of one or more of a briquette, powder, bead, and various agglomerates.

* * * * *